Patented Jan. 21, 1936

2,028,317

UNITED STATES PATENT OFFICE 2,028,317

WELDING ROD ALLOY

Homer W. Butterbaugh, Kenosha, Wis., assignor to The American Brass Company, Waterbury, Conn., a corporation of Connecticut No Drawing. Application March 5, 1935, Serial No. 9,381

3 Claims. (Cl. 219—8)

This invention relates to an alloy for welding or brazing, and more particularly to an alloy adapted for use as a filler material, such for example as a welding rod or other form, to be utilized for fusion welding or brazing in the joining of two pieces of metal by this means.

It is an object of the invention to provide an alloy which will not only have the desired characteristics of fusing at a sufficiently low temperature and being free flowing, but will also give high strength and finer grain or grain refinement in the weld area.

I have found that a weld rod or filler material composed of an alloy of approximately 55% to 65% copper, 0.1% to 3% nickel, 0.02% to 0.75% silicon and 31.25% to 44.88% zinc has these properties.

It may be used to special advantage in the electrical or oxyacetylene welding of cast and malleable iron, as well as steel and copper and copper alloys.

I have found that the addition of nickel and silicon in approximately the amounts noted to a copper zinc alloy containing about 55% to 65% copper considerably strengthens the alloy, and this strengthening constituent further produces a grain refinement in the weld area by virtue of the presence of the nickel, while the silicon serves to cleanse and protect the weld area while the metal is molten in the process of welding, giving a much stronger metal in the weld with a much better bond and therefore a better and stronger joint. While there may be other materials or combinations of other materials which might harden the weld metal, the nickel serves the purpose of grain refinement without the deleterious effects which may result from the addition of other materials, such as iron.

An example of a specific alloy within the ranges noted which I have found to be very satisfactory for this purpose is composed of approximately 57.5% copper, 41.5% zinc, 0.75% nickel, and 0.25% silicon. Another is composed of approximately 57.5% copper, 40.4% zinc, 2% nickel, and 0.1% silicon.

Having thus set forth the nature of my invention, what I claim is:

1. Filler material for welding composed of an alloy of approximately 55% to 65% copper, 0.1% to 3% nickel, 0.02% to 0.75% silicon and 31.25% to 44.88% zinc.

2. Filler material for welding composed of an alloy of approximately 57.5% copper, 41.5% zinc, 0.75% nickel, and 0.25% silicon.

3. Filler material for welding composed of an alloy of approximately 57.5% copper, 40.4% zinc, 2% nickel, and 0.1% silicon.

HOMER W. BUTTERBAUGH.